United States Patent
Inoue (10) Patent No.: US 9,696,526 B2
(45) Date of Patent: Jul. 4, 2017

(54) IMAGING LENS AND IMAGING APPARATUS

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/206,351

(22) Filed: Jul. 11, 2016

(65) Prior Publication Data

US 2017/0023779 A1    Jan. 26, 2017

(30) Foreign Application Priority Data

Jul. 22, 2015    (JP) .................... 2015-144899

(51) Int. Cl.
| | |
|---|---|
| G02B 9/04 | (2006.01) |
| G02B 21/02 | (2006.01) |
| G02B 13/18 | (2006.01) |
| G02B 13/04 | (2006.01) |
| G02B 9/60 | (2006.01) |
| G02B 27/00 | (2006.01) |
| G02B 23/24 | (2006.01) |

(52) U.S. Cl.
CPC .............. G02B 13/04 (2013.01); G02B 9/60 (2013.01); G02B 23/243 (2013.01); G02B 27/0025 (2013.01)

(58) Field of Classification Search
CPC ........... G02B 9/04; G02B 9/10; G02B 13/003
USPC .................... 359/661, 717, 753, 793
See application file for complete search history.

(56) References Cited

U.S. PATENT DOCUMENTS 6,025,961 A * 2/2000 Kohno ................ G02B 15/177
359/676
2012/0133802 A1    5/2012 Katakura et al.
2014/0307329 A1    10/2014 Katakura

FOREIGN PATENT DOCUMENTS

| JP | 51-002826 | 1/1976 |
|---|---|---|
| JP | 51-014017 | 5/1976 |
| JP | 5006476 B2 | 8/2012 |
| JP | 5566560 B1 | 8/2014 |

* cited by examiner

*Primary Examiner* — William Choi
(74) *Attorney, Agent, or Firm* — Studebaker & Brackett PC (57) ABSTRACT

An imaging lens is constituted by, in order from the object side to the image side: a front group having a negative refractive power; and a rear group having a positive refractive power. The front group is constituted by two negative lenses. The rear group includes a cemented lens formed by cementing a negative lens and a positive lens having a smaller Abbe's number with respect to the d line (wavelength: 587.6 nm) than the negative lens, provided in this order from the object side to the image side, together.

14 Claims, 8 Drawing Sheets

IMAGING LENS AND IMAGING APPARATUS

CROSS REFERENCE TO RELATED APPLICATIONS

The present application claims priority under 35 U.S.C. §119 to Japanese Patent Application No. 2015-144899 filed on Jul. 22, 2015. The above application is hereby expressly incorporated by reference, in its entirety, into the present application.

BACKGROUND

The present disclosure is related to an imaging lens and an imaging apparatus. More specifically, the present disclosure is related to an imaging lens which can be favorably utilized in an endoscope, a vehicle mounted camera, a surveillance camera, etc., and to an imaging apparatus equipped with this imaging lens.

Conventionally, endoscopes of the insertion type, in which an elongate insertion portion having an imaging device built in at the distal end portion thereof is inserted through the mouth or the nose of a patient to image the interiors of body cavities, are in common use in the medical field. Known imaging lenses which are utilizable in such endoscopes are disclosed in Japanese Patent Nos. 5006476 and 5566560, for example.

In addition to these endoscopes, there are known fish eye lenses which are utilizable in vehicle mounted cameras, surveillance cameras, and the like as disclosed in Japanese Patent Publication Nos. S51(1976)-002826 and S51(1976)-014017.

All of Japanese Patent No. 5006476, Japanese Patent No. 5566560, Japanese Patent Publication No. S51(1976)-002826, and Japanese Patent Publication No. S51(1976)-014017 disclose lens systems constituted by a front group, an aperture stop, and a rear group.

SUMMARY

However, correction of aberrations is insufficient in the lens systems disclosed in Japanese Patent No. 5006476, Japanese Patent No. 5566560, Japanese Patent Publication No. S51(1976)-002826, and Japanese Patent Publication No. S51(1976)-014017. Therefore, there is demand for an imaging lens, in which various aberrations are favorably corrected.

The present disclosure has been developed in view of the foregoing circumstances. The present disclosure provides an imaging lens, in which aberrations are favorably corrected, as well as an imaging apparatus equipped with this imaging lens.

The imaging lens of the present disclosure consists of, in order from the object side to the image side:
a front group having a negative refractive power; and
a rear group having a positive refractive power;
the front group consisting of, two negative lenses; and
the rear group having a first cemented lens formed by cementing a negative lens and a positive lens having a smaller Abbe's number with respect to the d line (wavelength: 587.6 nm) than the negative lens, provided in this order from the object side to the image side, together at the most object side therein.

In the imaging lens of the present disclosure, it is preferable for the rear group to have a lens different from the first cemented lens as a lens most toward the image side within the rear group, and for an aperture stop to be provided between the first cemented lens and the lens different from the first cemented lens.

In addition, it is preferable for Conditional Formula (1) below to be satisfied. Note that it is more preferable for Conditional Formula (1-1) below to be satisfied.

$$0.38 < f/fb < 1.00 \quad (1)$$

$$0.46 < f/fb < 0.86 \quad (1\text{-}1)$$

wherein f is the focal length of the entire lens system, and fb is the focal length of the rear group.

In addition, it is preferable for Conditional Formula (2) below to be satisfied. Note that it is more preferable for Conditional Formula (2-1) below to be satisfied.

$$0.00 < vd(F1) - vd(F2) < 30.00 \quad (2)$$

$$0.00 < vd(F1) - vd(F2) < 23.50 \quad (2\text{-}1)$$

wherein vd(F1) is the Abbe's number of the negative lens of the first cemented lens, and vd(F2) is the Abbe's number of the positive lens of the first cemented lens.

In addition, it is preferable for Conditional Formula (3) below to be satisfied. Note that it is more preferable for Conditional Formula (3-1) below to be satisfied.

$$-3.00 < f/fa < -0.95 \quad (3)$$

$$-2.50 < f/fa < -1.15 \quad (3\text{-}1)$$

wherein f is the focal length of the entire lens system, and fa is the focal length of the front group.

In addition, it is preferable for the rear group to further have a second cemented lens formed by cementing a positive lens and a negative lens, provided in this order from the object side to the image side, together.

In this case, it is preferable for Conditional Formula (4) below to be satisfied. Note that it is more preferable for Conditional Formula (4-1) below to be satisfied.

$$30.00 < vd(R1) - vd(R2) < 80.00 \quad (4)$$

$$35.00 < vd(R1) - vd(R2) < 75.00 \quad (4\text{-}1)$$

wherein vd(R1) is the Abbe's number of the positive lens of the second cemented lens, and vd(R2) is the Abbe's number of the negative lens of the second cemented lens.

In addition, it is preferable for the rear group to be constituted by five or fewer lenses.

In addition, it is preferable for the rear group to consist of, in order from the object side to the image side, the first cemented lens, a positive lens, and a second cemented lens formed by cementing a positive lens and a negative lens, provided in this order from the object side to the image side, together.

An imaging apparatus of the present disclosure is characterized by being equipped with the imaging lens of the present disclosure described above.

Note that the above expression "consists of" means that lenses that practically have no power, optical elements other than lenses such as a stop, a cover glass, and filters, and mechanical components such as lens flanges, a lens barrel, an imaging element, a camera shake correcting mechanism, etc. may be included, in addition to the constituent elements listed above.

In addition, the surface shapes, the radii of curvature, and the signs of the refractive powers of lenses in the above lens are those which are considered in the paraxial region for lenses that include aspherical surfaces.

The imaging lens of the present disclosure consists of, in order from the object side to the image side: the front group having a negative refractive power; and the rear group having a positive refractive power. The front group consists of two negative lenses. The rear group has a first cemented lens formed by cementing a negative lens and a positive lens having a smaller Abbe's number with respect to the d line (wavelength: 587.6 nm) than the negative lens, provided in this order from the object side to the image side, together at the most object side therein. Therefore, it is possible for the imaging lens to favorably correct various aberrations.

In addition, the imaging apparatus of the present disclosure is equipped with the imaging lens of the present disclosure. Therefore, the imaging apparatus of the present disclosure is capable of obtaining images having high image quality.

DETAILED DESCRIPTION OF THE PREFERRED EMBODIMENTS

Figure 1:
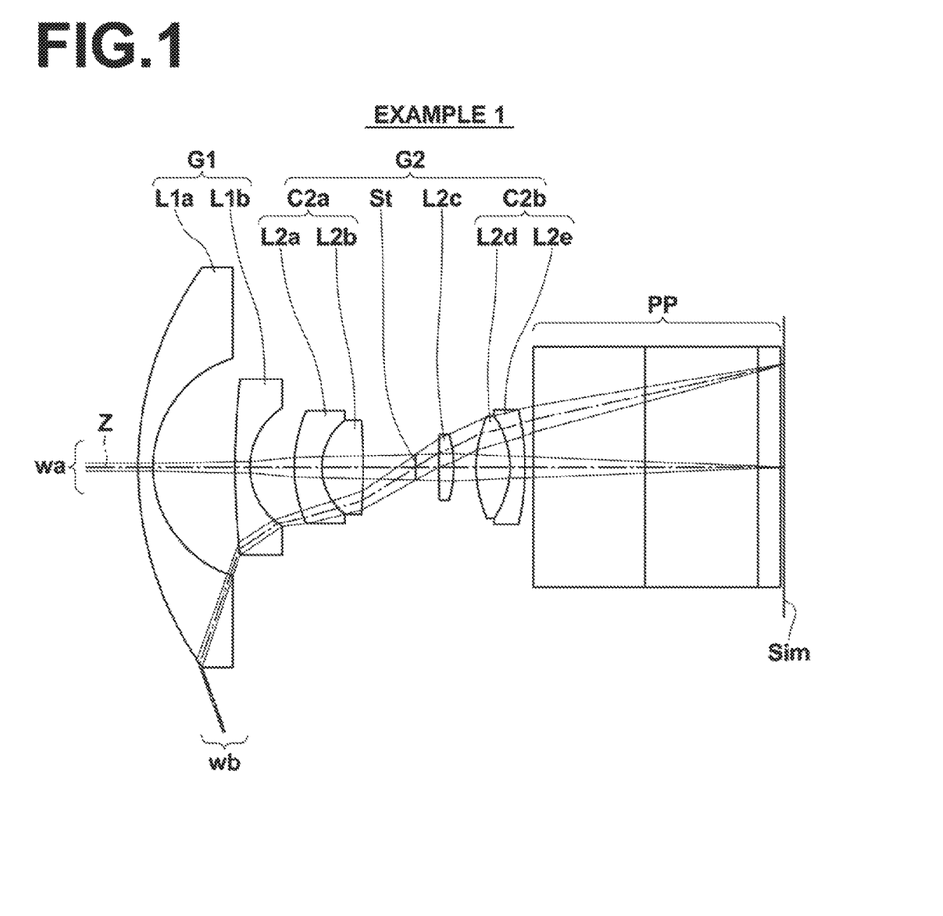
FIG. 1 is a cross sectional diagram that illustrates the lens configuration of an imaging lens according to an embodiment of the present disclosure (common with an imaging lens of Example 1).

Hereinafter, embodiments of the present disclosure will be described in detail with reference to the attached drawings. FIG. 1 is a cross sectional diagram that illustrates the lens configuration of an imaging lens according to an embodiment of the present disclosure. The example of the configuration illustrated in FIG. 1 corresponds to the configuration of an imaging lens of Example 1 to be described later. In FIG. 1, the left side is the object side, and the right side is the image side. Note that the aperture stop St illustrated in FIG. 1 does not necessarily represent the size or shape thereof, but merely indicates the position of the aperture stop St along an optical axis Z. In addition, FIG. 1 also illustrates an axial light beam wa and a light beam wb at a maximum angle of view.

As illustrated in FIG. 1, this imaging lens is constituted by, in order from the object side to the image side, a front group G1 having a negative refractive power, and a rear group G2 having a positive refractive power. By adopting a retro focus type configuration in this manner, back focus can be secured.

FIG. 1 illustrates an example in which an optical member PP having a light input surface and a light output surface which are parallel to each other is provided between the rear group G2 and an image formation plane Sim. The optical member PP presumes the presence of an optical path converting prism for bending optical paths, filters, a cover glass, etc. A configuration from which the optical member PP is omitted is also possible in the objective lens for endoscopes of the present disclosure. Note that in the case that an optical path converting prism is employed, optical paths will become bent. However, FIG. 1 is a diagram in which optical paths are expanded, in order to facilitate understanding.

The front group G1 is constituted by two negative lenses L1a and L1b. Providing two negative lenses at the most object side of the front group G1 in this manner contributes to a widening of the angle of view, and also enables field curvature to be suppressed.

The rear group G2 has a first cemented lens C2a formed by cementing a negative lens L2a and a positive lens L2b having a smaller Abbe's number with respect to the d line (wavelength: 587.6 nm) than the negative lens, provided in this order from the object side to the image side, together at the most object side therein. By adopting this configuration, sensitivity to eccentricities can be suppressed, while longitudinal chromatic aberration and lateral chromatic aberration can be favorably corrected.

In the imaging lens of the present embodiment, it is preferable for the rear group G2 to have a lens different from the first cemented lens C2a as a lens most toward the image side within the rear group G2, and for the aperture stop St to be provided between the first cemented lens C2a and the lens different from the first cemented lens C2a. By providing the first cemented lens C2a having the arrangements of Abbe's numbers described above at the object side of the aperture stop St, lateral chromatic aberration can be appropriately corrected at the image side of the aperture stop St.

In addition, it is preferable for Conditional Formula (1) below to be satisfied. By configuring the imaging lens such that the value of f/fb is not less than or equal to the lower limit defined in Conditional Formula (1), securing back focus and a shortening of the total length of the lens system can both be realized. In addition, by configuring the imaging lens such that the value of f/fb is not greater than or equal to the upper limit defined in Conditional Formula (1), field curvature can be suppressed. Note that more favorable properties can be obtained if Conditional Formula (1-1) below is satisfied.

$$0.38 < f/fb < 1.00 \qquad (1)$$

$$0.46 < f/fb < 0.86 \qquad (1\text{-}1)$$

wherein f is the focal length of the entire lens system, and fb is the focal length of the rear group.

In addition, it is preferable for Conditional Formula (2) below to be satisfied. By configuring the imaging lens such that the value of vd(F1)−vd(F2) is not less than or equal to the lower limit defined in Conditional Formula (2), lateral chromatic aberration can be suppressed. In addition, by configuring the imaging lens such that the value of vd(F1)−vd(F2) is not greater than or equal to the upper limit defined in Conditional Formula (2), longitudinal chromatic aberration can be suppressed. Note that more favorable properties can be obtained if Conditional Formula (2-1) below is satisfied.

$$0.00 < vd(F1) - vd(F2) < 30.00 \quad (2)$$

$$0.00 < vd(F1) - vd(F2) < 23.50 \quad (2\text{-}1)$$

wherein vd(F1) is the Abbe's number of the negative lens of the first cemented lens, and vd(F2) is the Abbe's number of the positive lens of the first cemented lens.

In addition, it is preferable for Conditional Formula (3) below to be satisfied. By configuring the imaging lens such that the value of f/fa is not less than or equal to the lower limit defined in Conditional Formula (3), field curvature can be suppressed. In addition, by configuring the imaging lens such that the value of f/fa is not greater than or equal to the upper limit defined in Conditional Formula (3), the field angle can be increased. Note that more favorable properties can be obtained if Conditional Formula (3-1) below is satisfied.

$$-3.00 < f/fa < -0.95 \quad (3)$$

$$-2.50 < f/fa < -1.15 \quad (3\text{-}1)$$

wherein f is the focal length of the entire lens system, and fa is the focal length of the front group.

In addition, it is preferable for the rear group G2 to further have a second cemented lens C2b formed by cementing a positive lens L2d and a negative lens L2e, provided in this order from the object side to the image side, together. By adopting this configuration, lateral chromatic aberration can be suppressed.

In this case, it is preferable for Conditional Formula (4) below to be satisfied. By configuring the imaging lens such that the value of vd(R1)−vd(R2) is not less than or equal to the lower limit defined in Conditional Formula (4), lateral chromatic aberration can be suppressed. In addition, by configuring the imaging lens such that the value of vd(R1)−vd(R2) is not greater than or equal to the upper limit defined in Conditional Formula (4), longitudinal chromatic aberration can be suppressed. Note that more favorable properties can be obtained if Conditional Formula (4-1) below is satisfied.

$$30.00 < vd(R1) - vd(R2) < 80.00 \quad (4)$$

$$35.00 < vd(R1) - vd(R2) < 75.00 \quad (4\text{-}1)$$

wherein vd(R1) is the Abbe's number of the positive lens of the second cemented lens, and vd(R2) is the Abbe's number of the negative lens of the second cemented lens.

In addition, it is preferable for the rear group G2 to be constituted by five or fewer lenses. Adopting this configuration contributes to miniaturization and a shortening of the imaging lens.

In addition, it is preferable for the rear group G2 to consist of, in order from the object side to the image side, the first cemented lens C2a, a positive lens L2c, and a second cemented lens C2b, formed by cementing a positive lens L2d and a negative lens L2e, provided in this order form the object side to the image side, together. By adopting this configuration, high optical performance can be realized. Not that the first cemented lens C2a exhibits the effect of suppressing longitudinal chromatic aberration and lateral chromatic aberration. In addition, the positive lens L2c exhibits the effect of suppressing spherical aberration. Further, the second cemented lens C2b exhibits the effect of suppressing lateral chromatic aberration.

In addition, it is preferable for a protective multiple layer film coating to be administered in the case that the present imaging lens is to be utilized in extreme environments. Further, an antireflection coating may be administered in addition to the protective coating, in order to reduce ghost light and the like during utilization of the imaging lens.

In addition, in the case that this imaging lens is applied to an imaging apparatus, it is preferable for a cover glass, prisms, and various filters, such as an infrared cutoff filter and a low pass filter, to be provided between the lens system and an image formation plane Sim, depending on the configuration of the imaging apparatus. Note that these filters may be provided among the lenses instead of being provided between the lens system and the image formation plane Sim. As a further alternative, coatings that exhibit the same effects as these filters may be administered on the lens surfaces of the lenses.

Next, examples of numerical values of the imaging lens of the present disclosure will be described.

First, an imaging lens of Example 1 will be described. FIG. 1 is a cross sectional diagram that illustrates the lens configuration of the imaging lens of Example 1. Note that in FIG. 1 and FIGS. 2 through 4 that correspond to Examples 2 through 4 to be described later, the left side is the object side and the right side is the image side. In addition, the aperture stops St illustrated in FIGS. 1 through 5 do not necessarily represent the sizes and shapes thereof, but only the positions thereof along the optical axis Z.

In the imaging lens of Example 1, the front group G1 is constituted by two negative lenses L1a and L1b. In addition, the rear group G2 is constituted by, in order from the object side to the image side, a first cemented lens C2a formed by cementing a negative lens L2a and a positive lens L2b, provided in this order from the object side to the image side, together, a positive lens L2c, and a second cemented lens C2b formed by cementing a positive lens L2d and a negative lens L2e, provided in this order from the object side to the image side, together.

Basic lens data are shown in Table 1, and data related to various items are shown in Table 2 for the imaging lens of Example 1. The meanings of the symbols in the tables will be described for Example 1 as an example, but the meanings are basically the same for Examples 2 through 5 as well.

In Table 1, surface numbers that sequentially increase with the surface of the constituent element most toward the object side being designated as 1 are listed in the column Surface Number; the radii of curvature of each surface are listed in the column Radius of Curvature; and distances along the optical axis Z between each surface and a surface adjacent thereto are listed in the column Distance. In addition, the refractive indices with respect to the d line (wavelength: 587.6 nm) of each constituent element are listed in the column n; and the Abbe's numbers with respect to the d line (wavelength: 587.6 nm) of each constituent element are listed in the column ν.

Here, the signs of the radii of curvature are positive in cases that the surface shape is convex toward the object side, and negative in cases that the surface shape is convex toward the image side. Table 1 also shows data regarding the aperture stop St and the optical member PP. Text reading "(Stop)" is indicated along with a surface number in the column of the surface number at the surface corresponding to the aperture stop.

The values of the focal length f' of the entire lens system, the back focus Bf', the F value F No., and the full angle of view 2ω are shown as data related to various items in Table 2.

In the basic lens data and the data related to various items, degrees are used as the units for angles and mm are used as the units for lengths. However, it is possible for optical systems to be proportionately enlarged or proportionately reduced and utilized. Therefore, other appropriate units may be used.

TABLE 1

Example 1: Lens Data (n and ν are for the d line)

| Surface Number | Radius of Curvature | Distance | n | ν |
|---|---|---|---|---|
| 1 | 4.5453 | 0.2000 | 1.65160 | 58.55 |
| 2 | 1.5152 | 1.1000 | | |
| 3 | 9.9993 | 0.2000 | 1.95375 | 32.32 |
| 4 | 0.9429 | 0.5917 | | |
| 5 | 1.8670 | 0.3667 | 1.63854 | 55.45 |
| 6 | 0.7905 | 0.5512 | 1.67270 | 32.10 |
| 7 | −7.5719 | 0.7051 | | |
| 8 (Stop) | ∞ | 0.3105 | | |
| 9 | 8.4126 | 0.2000 | 1.43875 | 94.66 |
| 10 | −1.6153 | 0.3000 | | |
| 11 | 1.6666 | 0.4500 | 1.43875 | 94.66 |
| 12 | −1.1985 | 0.2000 | 1.84666 | 23.78 |
| 13 | −3.4481 | 0.1117 | | |
| 14 | ∞ | 1.5000 | 1.55920 | 53.92 |
| 15 | ∞ | 1.5000 | 1.55920 | 53.92 |
| 16 | ∞ | 0.3000 | 1.51633 | 64.05 |
| 17 | ∞ | | | |

TABLE 2

Example 1: Items (d line)

| | |
|---|---|
| f | 0.94 |
| Bf | 2.22 |
| F No. | 7.97 |
| 2ω (°) | 219.6 |

Figure 5:
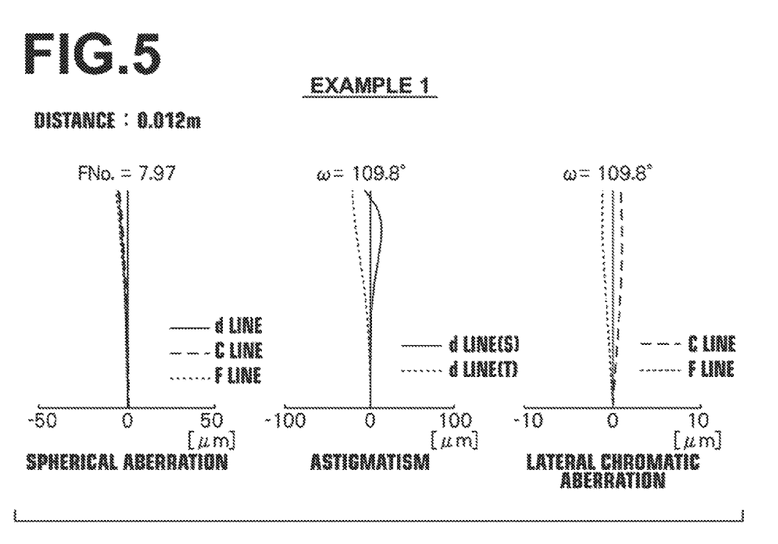
FIG. 5 is a collection of diagrams that illustrate various aberrations of the imaging lens of Example 1.

FIG. 5 is a collection of diagrams that illustrate aberrations of the imaging lens of Example 1. In FIG. 5, diagrams that illustrate spherical aberration, astigmatism, and lateral chromatic aberration of the imaging lens of Example 1 in a state focused on an object having a concave surface with a radius of curvature of 0.020 m toward the lens, positioned at a distance of 0.012 m from the lens, are illustrated in this order from the left side of the drawing sheet. The diagrams that illustrate spherical aberration and astigmatism show aberrations with the d line (wavelength: 587.6 nm) as a reference wavelength. The diagram that illustrates spherical aberration shows aberrations related to the d line (wavelength: 587.6 nm), the C line (wavelength: 656.3 nm), and the F line (wavelength: 486.1 mm), as a black solid line, a long broken line, and a dotted line, respectively. In the diagram that illustrates astigmatism, aberrations in the sagittal direction and aberrations in the tangential direction related to the d line are indicated by a solid line and a dotted line, respectively. In the diagram that illustrates lateral chromatic diagram, aberrations related to the C line (wavelength: 656.3 nm) and the F line (wavelength: 486.1 mm) are shown as a long broken line and a dotted line, respectively. In the diagram that illustrates spherical aberration, "FNo." denotes the F number. In the other diagrams that illustrate the aberrations, ω denotes half angles of view.

The symbols, the meanings, and the manners in which the various pieces of data are described in the description of Example 1 above are the same for the examples to be described below unless otherwise noted. Therefore, redundant descriptions will be omitted hereinafter.

Figure 2:
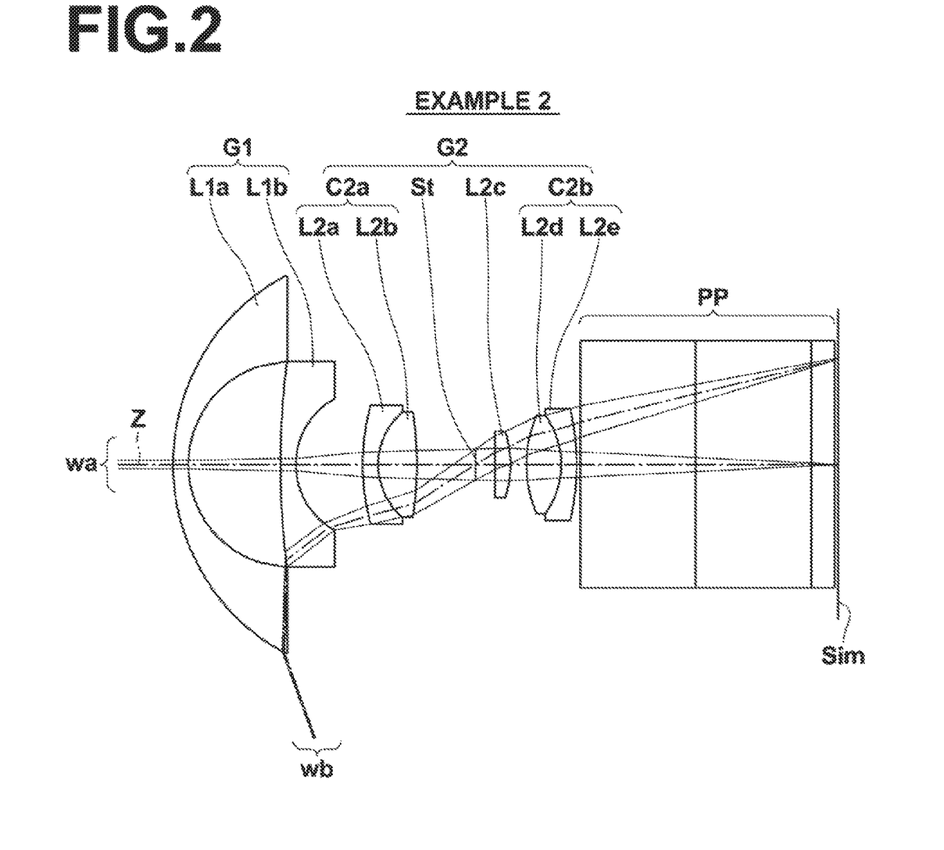
FIG. 2 is a cross sectional diagram that illustrates the lens configuration of an imaging lens according to Example 2 of the present disclosure.
Figure 6:
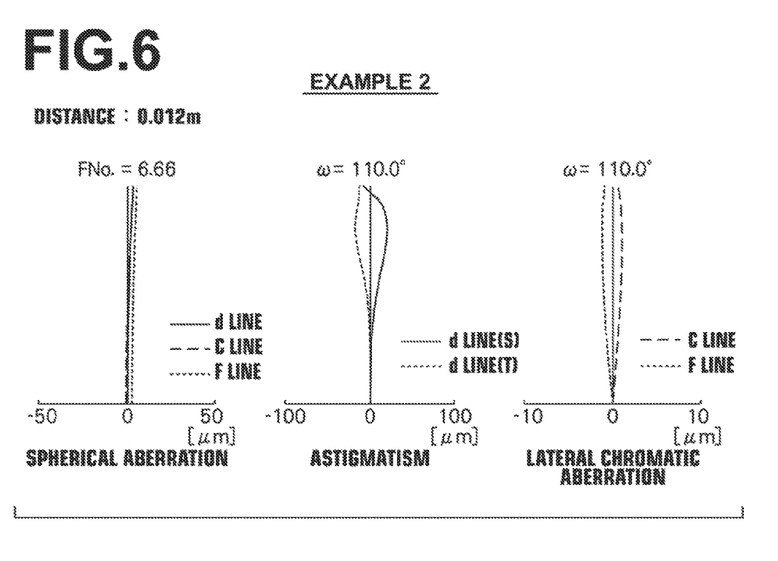
FIG. 6 is a collection of diagrams that illustrate various aberrations of the imaging lens of Example 2.

Next, an imaging lens of Example 2 will be described. FIG. 2 is a cross sectional diagram that illustrates the lens configuration of the imaging lens of Example 2. The imaging lens of Example 2 has the same lens configuration as the imaging lens of Example 1. Basic lens data are shown in Table 3, and data related to various items are shown in Table 4 for the imaging lens of Example 2. In addition, FIG. 6 is a collection of diagrams that illustrate various aberrations of the imaging lens of Example 2.

TABLE 3

Example 2: Lens Data (n and ν are for the d line)

| Surface Number | Radius of Curvature | Distance | n | ν |
|---|---|---|---|---|
| 1 | 2.7777 | 0.2000 | 1.65160 | 58.55 |
| 2 | 1.3333 | 1.2000 | | |
| 3 | 10.4104 | 0.2000 | 1.95375 | 32.32 |
| 4 | 0.9723 | 0.8677 | | |
| 5 | 2.9377 | 0.2000 | 1.63854 | 55.45 |
| 6 | 0.8913 | 0.5000 | 1.67270 | 32.10 |
| 7 | −4.7767 | 0.7740 | | |
| 8 (Stop) | ∞ | 0.2503 | | |
| 9 | −165.5932 | 0.2000 | 1.43875 | 94.66 |
| 10 | −1.4144 | 0.2081 | | |
| 11 | 1.5807 | 0.4500 | 1.43875 | 94.66 |
| 12 | −1.0839 | 0.2000 | 1.84666 | 23.78 |
| 13 | −3.2346 | 0.0500 | | |
| 14 | ∞ | 1.5000 | 1.55920 | 53.92 |
| 15 | ∞ | 1.5000 | 1.55920 | 53.92 |
| 16 | ∞ | 0.3000 | 1.51633 | 64.05 |
| 17 | ∞ | | | |

TABLE 4

Example 2: Items (d line)

| | |
|---|---|
| f | 0.85 |
| Bf | 2.17 |
| F No. | 6.66 |
| 2ω (°) | 220.0 |

Figure 3:
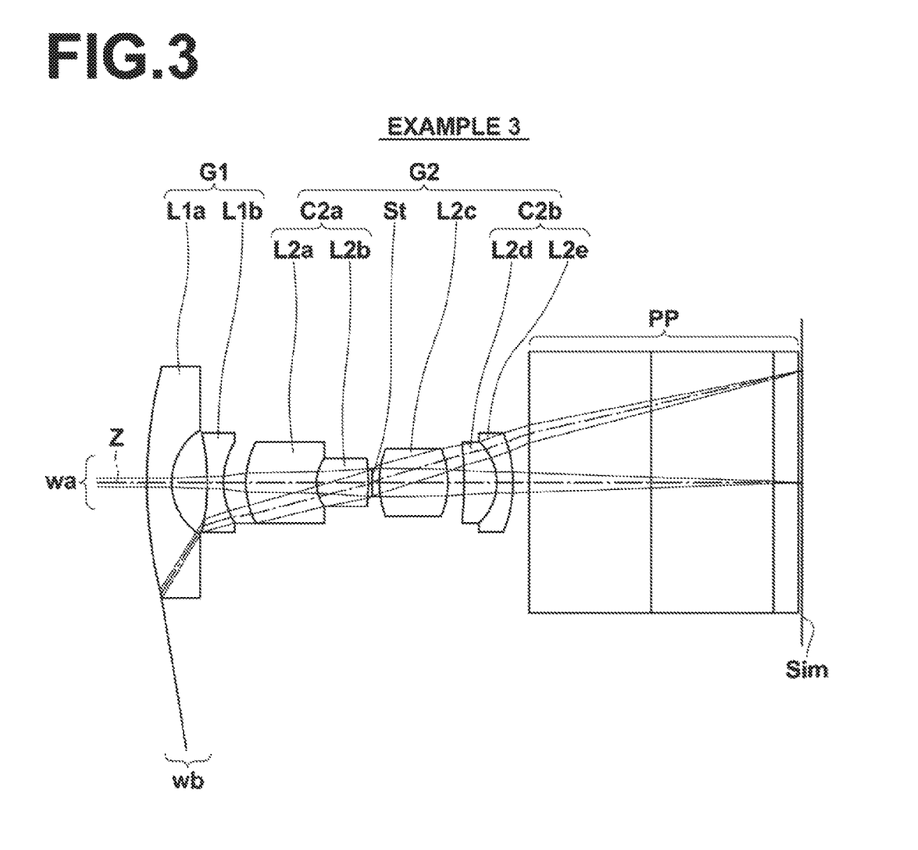
FIG. 3 is a cross sectional diagram that illustrates the lens configuration of an imaging lens according to Example 3 of the present disclosure.
Figure 7:
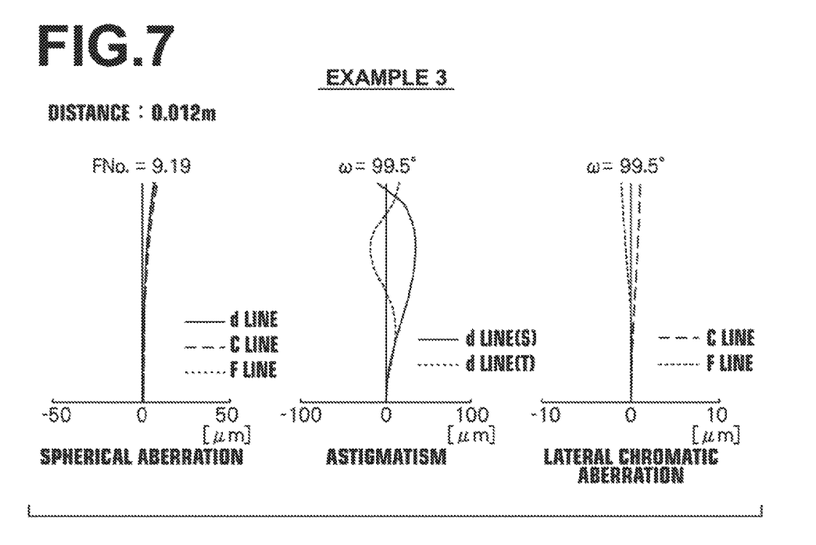
FIG. 7 is a collection of diagrams that illustrate various aberrations of the imaging lens of Example 3.

Next, an imaging lens of Example 3 will be described. FIG. 3 is a cross sectional diagram that illustrates the lens configuration of the imaging lens of Example 3. The imaging lens of Example 3 has the same lens configuration as the imaging lens of Example 1. Basic lens data are shown in Table 5, and data related to various items are shown in Table 6 for the imaging lens of Example 3. In addition, FIG. 7 is a collection of diagrams that illustrate various aberrations of the imaging lens of Example 3.

TABLE 5

Example 3: Lens Data (n and ν are for the d line)

| Surface Number | Radius of Curvature | Distance | n | ν |
|---|---|---|---|---|
| 1 | 5.6177 | 0.3006 | 1.43875 | 94.66 |
| 2 | 0.7505 | 0.4438 | | |
| 3 | −2.8257 | 0.2000 | 2.00100 | 29.13 |
| 4 | 0.9667 | 0.2745 | | |
| 5 | 1.0667 | 0.8659 | 1.95375 | 32.32 |
| 6 | 0.5000 | 0.6350 | 1.72151 | 29.23 |
| 7 | −2.3753 | 0.0500 | | |
| 8 (Stop) | ∞ | 0.0855 | | |
| 9 | 1.1679 | 0.8487 | 1.43875 | 94.66 |
| 10 | −1.0925 | 0.2000 | | |
| 11 | −4.8806 | 0.4000 | 1.48749 | 70.24 |
| 12 | −0.6721 | 0.2000 | 2.00100 | 29.13 |
| 13 | −1.5904 | 0.2000 | | |

TABLE 5-continued

Example 3: Lens Data (n and ν are for the d line)

| Surface Number | Radius of Curvature | Distance | n | ν |
|---|---|---|---|---|
| 14 | ∞ | 1.5000 | 1.55920 | 53.92 |
| 15 | ∞ | 1.5000 | 1.55920 | 53.92 |
| 16 | ∞ | 0.3000 | 1.51633 | 64.05 |
| 17 | ∞ | | | |

TABLE 6

Example 3: Items (d line)

| | |
|---|---|
| f | 1.09 |
| Bf | 2.28 |
| F No. | 9.19 |
| 2ω (°) | 199.0 |

Figure 4:
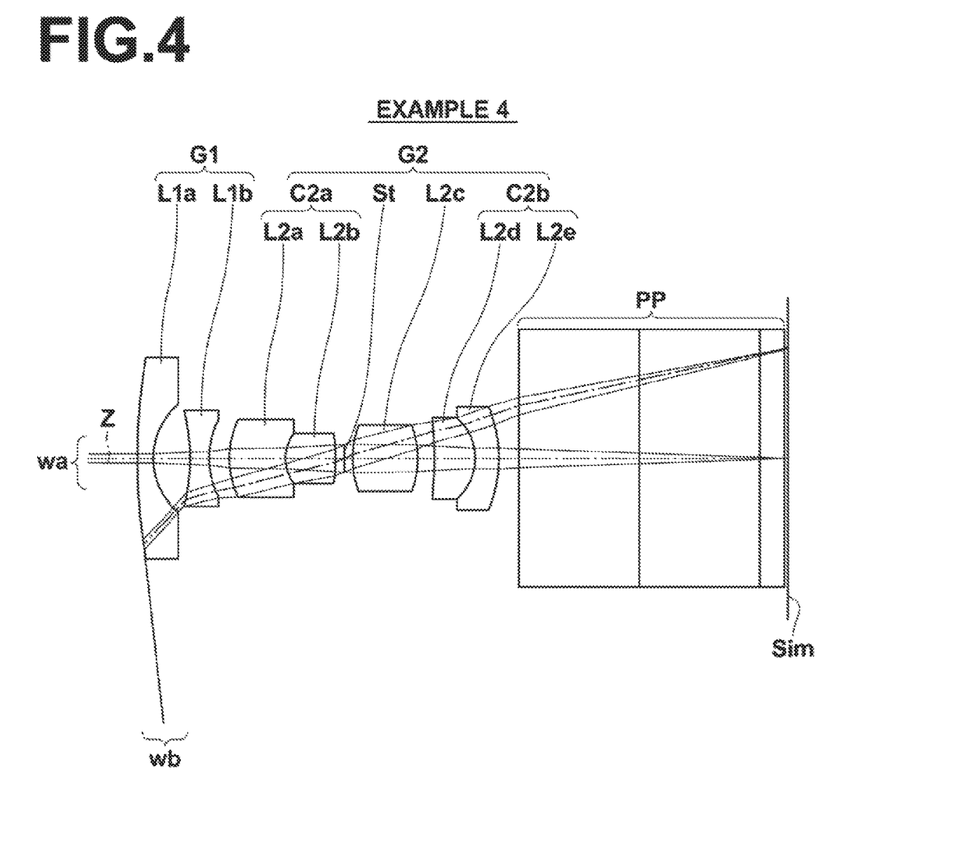
FIG. 4 is a cross sectional diagram that illustrates the lens configuration of an imaging lens according to Example 4 of the present disclosure.
Figure 8:
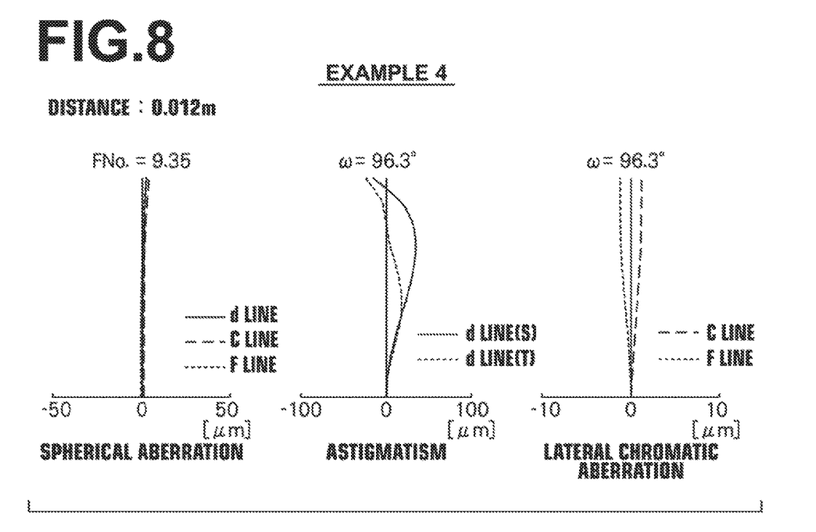
FIG. 8 is a collection of diagrams that illustrate various aberrations of the imaging lens of Example 4.

Next, an imaging lens of Example 4 will be described. FIG. 4 is a cross sectional diagram that illustrates the lens configuration of the imaging lens of Example 4. The imaging lens of Example 4 has the same lens configuration as the imaging lens of Example 1. Basic lens data are shown in Table 7, and data related to various items are shown in Table 8 for the imaging lens of Example 4. In addition, FIG. 8 is a collection of diagrams that illustrate various aberrations of the imaging lens of Example 4.

TABLE 7

Example 4: Lens Data (n and ν are for the d line)

| Surface Number | Radius of Curvature | Distance | n | ν |
|---|---|---|---|---|
| 1 | 7.3449 | 0.1967 | 1.59551 | 39.24 |
| 2 | 0.8614 | 0.4623 | | |
| 3 | −2.4876 | 0.2404 | 1.85135 | 40.10 |
| 4 | 1.0726 | 0.2500 | | |
| 5 | 1.1062 | 0.6968 | 1.95375 | 32.32 |
| 6 | 0.5089 | 0.6224 | 1.69895 | 30.13 |
| 7 | −2.3459 | 0.1092 | | |
| 8 (Stop) | ∞ | 0.1055 | | |
| 9 | 1.1951 | 0.8180 | 1.43875 | 94.66 |
| 10 | −1.0920 | 0.2040 | | |
| 11 | −4.5653 | 0.5079 | 1.51633 | 64.14 |
| 12 | −0.6673 | 0.2948 | 2.00100 | 29.13 |
| 13 | −1.6536 | 0.2493 | | |
| 14 | ∞ | 1.5000 | 1.55920 | 53.92 |
| 15 | ∞ | 1.5000 | 1.55920 | 53.92 |
| 16 | ∞ | 0.3000 | 1.51633 | 64.05 |
| 17 | ∞ | | | |

TABLE 8

Example 4: Items (d line)

| | |
|---|---|
| f | 1.12 |
| Bf | 2.32 |
| F No. | 9.35 |
| 2ω (°) | 192.6 |

Table 9 shows values corresponding to Conditional Formulae (1) through (4) for the imaging lenses of Examples 1 through 4. Note that all of the Examples use the d line as a reference wavelength, and the values shown in Table 9 below are those for the reference wavelength.

TABLE 9

| Formula | Condition | Example 1 | Example 2 | Example 3 | Example 4 |
|---|---|---|---|---|---|
| (1) | f/fb | 0.529 | 0.497 | 0.858 | 0.839 |
| (2) | νd(F1)−νd(F2) | 23.350 | 23.350 | 3.086 | 2.191 |
| (3) | f/fa | −1.385 | −1.171 | −2.481 | −2.417 |
| (4) | νd(R1)−νd(R2) | 70.875 | 70.875 | 41.101 | 35.007 |

As can be understood from the above data, all of the imaging lenses of Examples 1 through 4 satisfy Conditional Formulae (1) through (4), and are imaging lenses in which various aberrations are favorably corrected.

Figure 9:
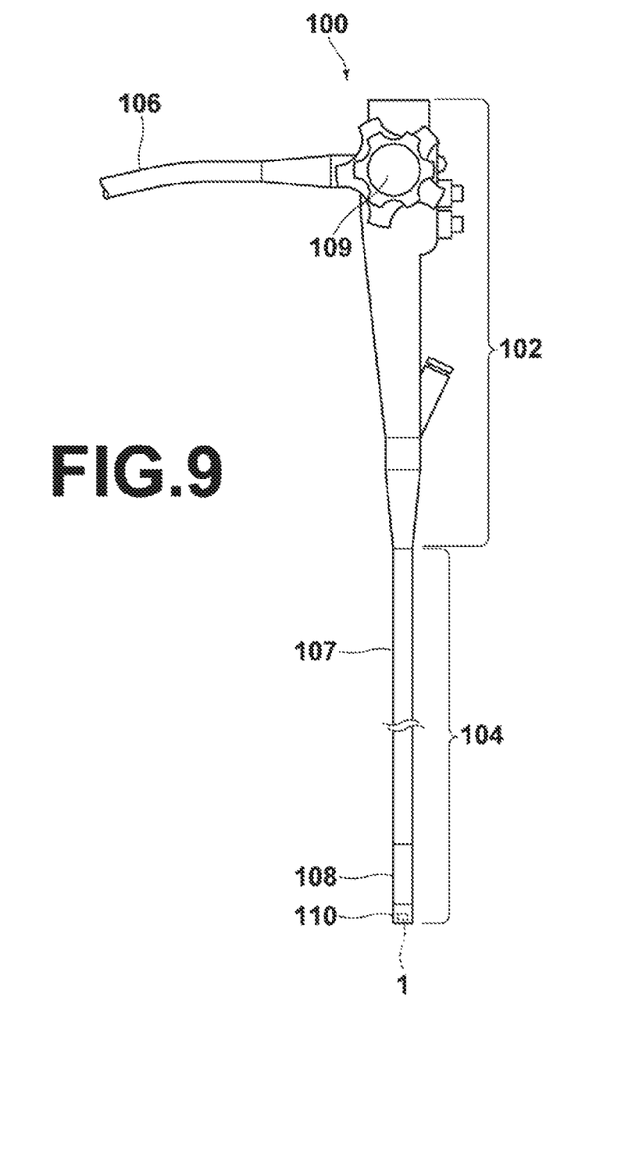
FIG. 9 is a diagram that schematically illustrates an imaging apparatus according to an embodiment of the present disclosure.

Next, imaging apparatuses according to embodiments of the present disclosure will be described. First, an example of a case in which an endoscope is the embodiment of an imaging apparatus of the present disclosure will be described. FIG. 9 is a diagram that illustrates the schematic structure of the entirety of the endoscope.

The endoscope 100 illustrated in FIG. 9 is mainly equipped with an operating portion 102, an insertion portion 104, and a universal cord 106 to be connected to a connector portion (not shown). The majority of the insertion portion 104 is a flexible portion 107 which can be bent in desired directions along an insertion path. A bendable portion 108 is linked to the leading end of the flexible portion 107, and a leading end portion 110 is linked to the leading end of the bendable portion 108. The bendable portion 108 is provided to orient the leading end portion 110 in desired directions. Bending operations are enabled by rotating a bending operation knob 109 provided on the operating portion 102. An imaging lens 1 according to an embodiment of the present disclosure is provided within the interior of the leading end portion 110. Note that the imaging lens 1 is schematically illustrated in FIG. 9. The endoscope of the present embodiment is equipped with the imaging lens 1 of the present disclosure. Therefore, the endoscope is capable of obtaining favorable images.

Figure 10:
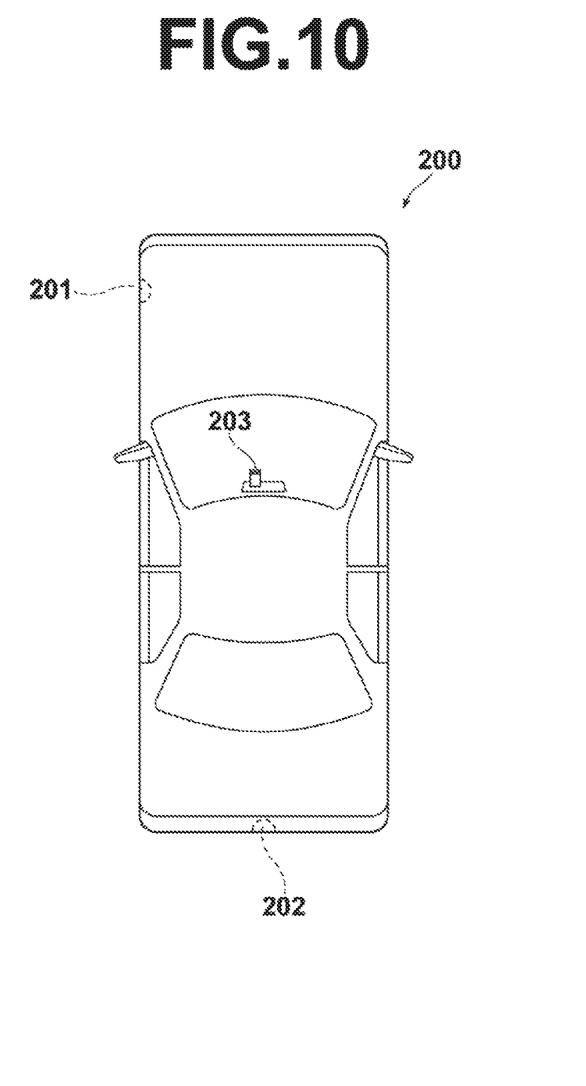
FIG. 10 is a diagram that schematically illustrates an imaging apparatus according to another embodiment of the present disclosure.

Next, an example of a case in which a vehicle mounted camera is the embodiment of an imaging apparatus of the present disclosure will be described. FIG. 10 is a diagram that illustrates the manner in which vehicle mounted cameras are mounted on an automobile.

In FIG. 10, an automobile 200 is equipped with an externally mounted camera 201 for imaging a blind spot range at the side surface on the side of the passenger seat, an externally mounted camera 202 for imaging a blind spot range at the rear side of the automobile 200, and a internally mounted camera 203 which is mounted on the back surface of the rear view mirror and images the same range as the field of view of a driver. The externally mounted camera 201, the externally mounted camera 202, and the internally mounted camera 203 are imaging apparatuses according to an embodiment of the present disclosure, and are equipped with imaging lenses according to an embodiment of the present disclosure and imaging elements that convert optical images formed by the imaging lenses into electrical signals. The vehicle mounted cameras of the present embodiment (the externally mounted cameras 201 and 202, as well as the internally mounted camera 203) are equipped with the imaging lens of the present disclosure. Therefore, the vehicle mounted cameras are capable of obtaining favorable images.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, etc. of the lens components are not limited to those exemplified in the above Examples, and may be different values.

What is claimed is:

1. An imaging lens consisting of, in order from the object side to the image side:
   a front group having a negative refractive power; and
   a rear group having a positive refractive power;
   the front group consisting of, two negative lenses; and
   the rear group comprising a first cemented lens formed by cementing a negative lens and a positive lens having a smaller Abbe's number with respect to the d line (wavelength: 587.6 nm) than the negative lens, provided in this order from the object side to the image side, together at the most object side therein.

2. An imaging lens as defined in claim 1, wherein:
   the rear group has a lens different from the first cemented lens as a lens most toward the image side within the rear group; and
   an aperture stop is provided between the first cemented lens and the lens different from the first cemented lens.

3. An imaging lens as defined in claim 1, in which Conditional Formula (1) below is satisfied:

$$0.38 < f/fb < 1.00 \qquad (1)$$

wherein f is the focal length of the entire lens system, and fb is the focal length of the rear group.

4. An imaging lens as defined in claim 3, in which Conditional Formula (1-1) below is satisfied:

$$0.46 < f/fb < 0.86 \qquad (1\text{-}1).$$

5. An imaging lens as defined in claim 1, in which Conditional Formula (2) below is satisfied:

$$0.00 < vd(F1) - vd(F2) < 30.00 \qquad (2)$$

wherein vd(F1) is the Abbe's number of the negative lens of the first cemented lens, and vd(F2) is the Abbe's number of the positive lens of the first cemented lens.

6. An imaging lens as defined in claim 5, in which Conditional Formula (2-1) below is satisfied:

$$0.00 < vd(F1) - vd(F2) < 23.50 \qquad (2\text{-}1).$$

7. An imaging lens as defined in claim 1, in which Conditional Formula (3) below is satisfied:

$$-3.00 < f/fa < -0.95 \qquad (3)$$

wherein f is the focal length of the entire lens system, and fa is the focal length of the front group.

8. An imaging lens as defined in claim 7, in which Conditional Formula (3-1) below is satisfied:

$$-2.50 < f/fa < -1.15 \qquad (3\text{-}1).$$

9. An imaging lens as defined in claim 1, wherein:
   the rear group further comprises a second cemented lens formed by cementing a positive lens and a negative lens, provided in this order from the object side to the image side, together.

10. An imaging lens as defined in claim 9, in which Conditional Formula (4) below is satisfied:

$$30.00 < vd(R1) - vd(R2) < 80.00 \qquad (4)$$

wherein vd(R1) is the Abbe's number of the positive lens of the second cemented lens, and vd(R2) is the Abbe's number of the negative lens of the second cemented lens.

11. An imaging lens as defined in claim 10, in which Conditional Formula (4-1) below is satisfied:

$$35.00 < vd(R1) - vd(R2) < 75.00 \qquad (4\text{-}1).$$

12. An imaging lens as defined in claim 1, wherein:
   the rear group consists of five or fewer lenses.

13. An imaging lens as defined in claim 1, wherein:
   the rear group consists of, in order from the object side to the image side, the first cemented lens, a positive lens, and a second cemented lens formed by cementing a positive lens and a negative lens, provided in this order from the object side to the image side, together.

14. An imaging apparatus equipped with an imaging lens as defined in claim 1.

* * * * *